United States Patent Office 3,067,046
Patented Dec. 4, 1962

3,067,046
NEW COMPOSITION OF MATTER
Samuel Arthur Hooker, Box 1327, Martinsville, Va.
No Drawing. Filed Jan. 27, 1959, Ser. No. 789,265
4 Claims. (Cl. 106—15)

The present invention relates to novel anti-sticking compositions useful for application to wood surfaces. The invention is especially useful in the treatment of wood parts which tend to stick such as windows, drawers, doors and the like although it is not limited thereto.

One of the principal objects of the invention is the provision of novel formulations of the type indicated which, in addition to their outstanding anti-sticking characteristics, also offer the unique advantage of rendering wood surfaces treated therewith mothproof. Thus, for example, the compositions described herein may be used to prevent the sticking of bureau drawers or the like while at the same time moth-proofing the treated material. Other objects will also be apparent from the detailed description which follows.

Broadly stated, the novel compositions of the invention are liquids which consist essentially of a mixture of paraffin wax, spermaceti wax, at least one member of the group consisting of dieldrin, aldrin and endrin, methylene chloride, mineral spirits and, optionally, one or more coloring agents.

Dieldrin, aldrin and endrin are solids which are available from the Shell Chemical Corporation. These materials demonstrate mothproofing and other insect repellent characteristics which are particularly evident in the unique combination herein described. Dieldrin has been identified as essentially 1,2,3,4,10,10-hexachloro-6,7-epoxy-1,4,4a,5,6,7,8,8a - octahydro - 1,4 - endo,exo-5,8-dimethanonaphthalene. Aldrin is essentially 1,2,3,4,10,10-hexachloro - 1,4,4a,5,8,8a - hexahydro - 1,4-endo,exo - 5,8-dimethanonaphthalene while endrin is primarily 1,2,3,4,10,10 - hexachloro - 6,7 - epoxy - 1,4,4a,5,6,7,8,8a-octahydro-1,4-endo,endo-5,8-dimethanonaphthalene.

The paraffin wax used herein is desirably highly refined. A preferred form of such wax is 120–128 AMP refined wax. The spermaceti wax should also be highly refined and essentially pure.

It has been found convenient to prepare the present formulations in 55 gallon batches. On such a basis, the formulations should have the following composition, in addition to a minor amount of coloring matter, if desired:

15–25 pounds—spermaceti wax (U.S.P.)
40–55 pounds—paraffin wax (120–128 AMP)
.05–2.5 pounds—dieldrin
0.5–1.5 gallons—methylene chloride
Balance—mineral spirits It is important to the success of the invention that, per 55 gallon batch of the composition, the total wax content is not less than 50 pounds. The amount of paraffin wax should also in all instances be at least twice the amount of spermaceti wax.

One particularly preferred formulation according to the invention comprises, per 55 gallon batch:

25 pounds spermaceti wax (U.S.P.)
55 pounds paraffin wax (120–128 AMP)
2–2½ pounds dieldrin
1 gallon methylene chloride
40–41 gallons mineral spirits A small amount, e.g. 1 gram, of any appropriate coloring agent is also included if desired to give the composition appropriate coloring. It will be appreciated that correspondingly smaller amounts of the essential ingredients will be used when a smaller batch than the indicated 55 gallons is prepared.

According to another preferred formulation of the invention, the spermaceti and paraffin wax contents noted in the preceding paragraph may be reduced to 17 pounds and 41 pounds, respectively, with all other ingredients remaining essentially the same, to give a highly desirable anti-sticking composition demonstrating mothproofing and insect repellent characteristics. Endrin or aldrin may be substituted for, or mixed with, the dieldrin in the above formulations to give effective results.

If desired, the compositions described herein may be further modified to include additional ingredients such as odor control or masking agents, typically vanilla extract or other suitable deodorants. Other modifiers may include small amounts of suitable resins or the like, such as Picolyte Resin S100, for reduction of the wax content.

The method of preparing the instant compositions is also important to the success of the invention. Thus, while various formulating methods may be used, it is a desirable step of the method to initially dissolve the dieldrin, endrin or aldrin in flake form in the waxes before admixture with the other materials. This is accomplished by first preparing a melt comprising the mixture of waxes and dieldrin or the like at a temperature of up to 200° F. Dieldrin, endrin and/or aldrin easily go into solution and a highly effective admixture is obtained. The methylene chloride and mineral spirits are then added to the wax-dieldrin mixture at a temperature of the order of 100 to 250° F., with stirring followed by addition, if desired, of coloring matter and any other materials. The resulting product is a solution which may tend to settle out into a waxy layer and solvent layer on relatively long standing at temperatures below 68–70° F. However, with slight warming to, for example, 68–70° F., a uniform solution is formed which may be easily and uniformly spread on the desired surfaces in conventional manner, e.g. by spraying, brushing, mopping, sponging, etc. Upon drying, a highly desirable, long lasting protective coating resistant to sticking and demonstrating mothproof characteristics and other insect repellent properties is obtained.

The compositions of the invention may be applied to any type of wood surface, typically floors or furniture, where anti-sticking characteristics as well as mothproofing and protection against other insects, such as termites, bugs, silver fish, etc., are desired. The compositions are outstanding in the treatment of tables, desk drawers, doors, windows, kitchen cabinets, etc. Wood surfaces which involve sliding parts are particularly receptive to treatment with the present products. It has been ascertained that the mothproofing qualities of the present products will last for several years since the endrin, aldrin and dieldrin are kept active by the other components of the formulation, particularly the wax residues, which remain in the treated surfaces for long periods of time unless removed by leaching with an appropriate solvent. The products described herein do not stain the treated wood or materials in contact therewith.

Having described my invention what I claim as new is:

1. An anti-sticking and mothproofing composition, which on the basis of 55 gallons thereof, consists essentially of: 15–25 pounds spermaceti wax; 40–55 pounds paraffin wax the amount of paraffin wax being at least twice the amount of spermaceti wax; .05–2.5 pounds of a member of the group consisting of dieldrin, endrin and aldrin; 0.5–1.5 gallons methylene chloride and balance mineral spirits.

2. An anti-sticking and mothproofing composition which, on the basis of 55 gallons thereof, consists essentially of: 25 pounds spermaceti wax; 55 pounds paraffin wax; 2–2.5 pounds dieldrin; 1 gallon methylene chloride and 40–41 gallons mineral spirits, with a coloring agent.

3. The method of making the composition of claim 1 which comprises preparing a melt of the paraffin wax, spermaceti wax and said member and then adding said mineral spirits and methylene chloride to the resulting mixture between 100° and 250° F.

4. The method of rendering a wood surface anti-sticking and mothproof which comprises applying the composition of claim 1 to said surface.

References Cited in the file of this patent

UNITED STATES PATENTS

| 2,094,771 | Charch et al. | Oct. 5, 1937 |
| 2,526,892 | Minich | Oct. 24, 1950 |
| 2,561,816 | Pabst et al. | July 24, 1951 |